United States Patent
Finn et al.

(10) Patent No.: US 7,660,666 B2
(45) Date of Patent: Feb. 9, 2010

(54) GEOGRAPHIC DATABASE WITH DETAILED LOCAL DATA

(75) Inventors: Michael Finn, Lake Zurich, IL (US); Jason Borak, Algonquin, IL (US); James Ronald Bennett, San Jose, CA (US)

(73) Assignee: Navteq North America, LLC, Chicago, IL (US)

( * ) Notice: Subject to any disclaimer, the term of this patent is extended or adjusted under 35 U.S.C. 154(b) by 783 days.

(21) Appl. No.: 11/283,520

(22) Filed: Nov. 18, 2005

(65) Prior Publication Data

US 2007/0118278 A1    May 24, 2007

(51) Int. Cl.
*G01C 21/32* (2006.01)
(52) U.S. Cl. .................................. 701/208; 701/209
(58) Field of Classification Search ......... 701/201–213, 701/117; 340/995.13, 995.14, 995.19; 235/382, 235/384, 383, 385, 492, 472.03, 472.02, 235/472.1
See application file for complete search history.

(56) References Cited

U.S. PATENT DOCUMENTS

| | | | |
|---|---|---|---|
| 5,948,040 A * | 9/1999 | DeLorme et al. | 701/201 |
| 6,926,203 B1 * | 8/2005 | Sehr | 235/492 |
| 6,952,644 B2 | 10/2005 | Nakagawa | 701/200 |
| 2004/0030490 A1 | 2/2004 | Hegedus et al. | 701/200 |
| 2005/0051623 A1 | 3/2005 | Okuda et al. | 235/384 |
| 2005/0171686 A1 | 8/2005 | Davis | 701/200 |
| 2005/0203698 A1 | 9/2005 | Lee | 701/200 |
| 2005/0251331 A1 | 11/2005 | Kreft | 201/207 |

OTHER PUBLICATIONS

EPA No. 06255246 EP Search Report, dated Feb. 28, 2007.

* cited by examiner

*Primary Examiner*—Richard M. Camby
(74) *Attorney, Agent, or Firm*—Lisa M. Schoedel; Frank J. Kozak; Jon D. Shutter

(57) ABSTRACT

A method is disclosed for representing locations in a geographic database in a manner that facilitates navigation and routing. A core map database includes data that represents public roads in a geographic region. Each of a plurality of location map databases includes data that represent facilities, such as businesses, stores, offices, or other places, that are physically located away from the public network and access to which requires travel on paths away from the public road network. Each of the facilities represented in the location map databases is assigned a location reference code that is associated with data from which a path connecting the facility and the public road network can be determined.

31 Claims, 10 Drawing Sheets

FIG. 8

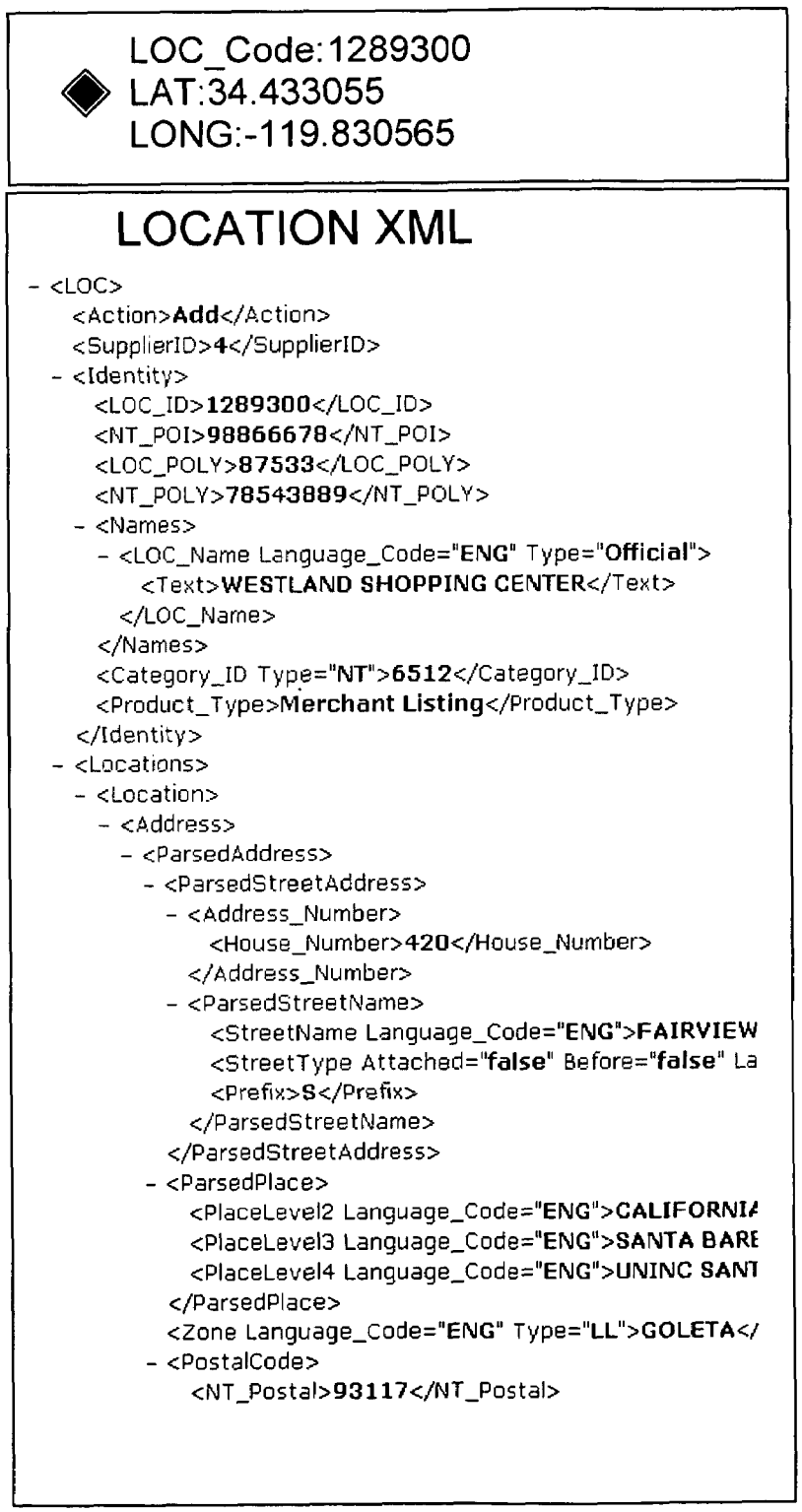

LOC_Code:1289300
LAT:34.433055
LONG:-119.830565

LOCATION XML

```
- <LOC>
    <Action>Add</Action>
    <SupplierID>4</SupplierID>
  - <Identity>
      <LOC_ID>1289300</LOC_ID>
      <NT_POI>98866678</NT_POI>
      <LOC_POLY>87533</LOC_POLY>
      <NT_POLY>78543889</NT_POLY>
    - <Names>
      - <LOC_Name Language_Code="ENG" Type="Official">
          <Text>WESTLAND SHOPPING CENTER</Text>
        </LOC_Name>
      </Names>
      <Category_ID Type="NT">6512</Category_ID>
      <Product_Type>Merchant Listing</Product_Type>
    </Identity>
  - <Locations>
    - <Location>
      - <Address>
        - <ParsedAddress>
          - <ParsedStreetAddress>
            - <Address_Number>
                <House_Number>420</House_Number>
              </Address_Number>
            - <ParsedStreetName>
                <StreetName Language_Code="ENG">FAIRVIEW
                <StreetType Attached="false" Before="false" La
                <Prefix>S</Prefix>
              </ParsedStreetName>
            </ParsedStreetAddress>
          - <ParsedPlace>
              <PlaceLevel2 Language_Code="ENG">CALIFORNI/
              <PlaceLevel3 Language_Code="ENG">SANTA BARE
              <PlaceLevel4 Language_Code="ENG">UNINC SAN1
            </ParsedPlace>
            <Zone Language_Code="ENG" Type="LL">GOLETA</
          - <PostalCode>
              <NT_Postal>93117</NT_Postal>
```

LOCATION REFERENCE CODE 270

FIG. 9

LOC_Code:9 LAT:34.433043
LONG:-119.830542

LOCATION XML

```xml
- <LOC>
    <Action>Add</Action>
    <SupplierID>4</SupplierID>
  - <Identity>
      <LOC_ID>9</LOC_ID>
      <PARENT_ID>1289300</PARENT_ID>
      <NT_POI>98866678</NT_POI>
      <LOC_POLY>87533</LOC_POLY>
      <NT_POLY>78543889</NT_POLY>
    - <Names>
      - <LOC_Name Language_Code="ENG" Type="Official">
          <Text>STARBUCKS</Text>
        </LOC_Name>
      </Names>
      <Category_ID Type="NT">9996</Category_ID>
      <Product_Type>Merchant Listing</Product_Type>
    </Identity>
  - <Locations>
    - <Location>
      - <Address>
        - <ParsedAddress>
          - <ParsedStreetAddress>
            - <Address_Number>
                <House_Number>420</House_Number>
              </Address_Number>
            - <ParsedStreetName>
                <StreetName Language_Code="ENG">FAIRVIEW<
                <StreetType Attached="false" Before="false" Lan(
                <Prefix>S</Prefix>
              </ParsedStreetName>
            </ParsedStreetAddress>
          - <ParsedPlace>
              <PlaceLevel2 Language_Code="ENG">CALIFORNIA<
              <PlaceLevel3 Language_Code="ENG">SANTA BARB/
              <PlaceLevel4 Language_Code="ENG">UNINC SANTA
            </ParsedPlace>
            <Zone Language_Code="ENG" Type="LL">GOLETA</Z|
          - <PostalCode>
```

← LOCATION REFERENCE CODE 270

GEOGRAPHIC DATABASE WITH DETAILED LOCAL DATA

BACKGROUND OF THE INVENTION

The present invention relates to ways to represent locations to facilitate navigation and routing.

There are various kinds of computer-based navigation and mapping systems that facilitate finding and routing to desired destinations. For example, navigation systems installed in vehicles provide useful information to vehicle drivers and passengers, including information for finding desired destinations, as well as route guidance information for driving to destinations. Similar features are available on portable (e.g., handheld) devices. Some of these types of portable devices can be used in vehicles, but can also be carried by pedestrians or by persons using other modes of transportation, such as trains, ferries, and so on. Navigation and routing information is also available from Internet sites. Navigation and routing information is also available on mobile phones.

These systems and applications rely on data that represents the road network and other geographic features in a region. In order to support navigation and routing functions, the geographic data used in these systems and applications includes information about streets, address ranges, speed limits along roads, one-way streets, turn restrictions, locations of businesses and other points of interest, and so on.

Conventional navigation systems and routing applications generally perform well for finding destinations and providing guidance to travel to desired destinations. However, there is room for improvement. One area in which there is room for improvement relates to destinations that are located off the public road network. It sometimes occurs that stores, offices and other buildings are actually physically located some distance from their official listed street addresses. For example, even though a building may have a listed street address along a public road, it may be necessary to travel along a private access road or across a parking lot to reach the actual physical location of the building. In these cases, when a navigation system user has specified a desired destination by its street address, the user may arrive at the specified street address but find it still necessary to travel on an access road or cross a parking area to physically reach the desired destination. In some cases, it even may be unclear how to reach the desired destination from the street address.

Another situation that sometimes occurs is that the desired destination is a store located in a shopping mall. In this case, the store may have a street address along a public road, but it may be necessary to park in a lot and walk through the mall to reach the store. In this case, a navigation system user may arrive at the street address of the store, but find it unclear where to park and how to physically reach the desired destination.

These are some situations where conventional navigation and routing applications may leave room for improvements, i.e., to provide meaningful guidance that enables users to travel all the way to their desired destinations. Further, there is a need for improvements in providing the kind of data that enables navigation and routing applications to offer better routing and guidance.

SUMMARY OF THE INVENTION

To address these and other objectives, the present invention includes a geographic database system comprised of a core database and one or more location (or local) databases. The core database includes data that represents the public road network in a geographic region. Each of the location databases includes data that represent facilities, such as business, stores, offices, or other places, some of which may be physically located away from the public road network and access to which requires travel on paths away from the public road network. Each of the facilities represented in the location databases is assigned a unique location reference code. The location reference code assigned to a facility is associated with data indicating the location of the facility and data from which a path connecting the facility to the public road network represented in the core database can be determined.

According to a further aspect, each of the location databases includes data that represents additional features, such as parking lots, store entrances, driveways, or other places, physically located away from the public road network and that provide access to the facilities represented in the location databases. Each of these additional features is also represented by a unique location reference code. Each location reference code, whether it represents a facility or a feature that provides access to a facility, is associated with data that identifies either another location reference code or an access location on the public road network. The location reference code that represents a facility is associated with data that identifies, directly or via one or more other location reference codes, an access location on the public road network, whereby the path from the facility to the public road network can be determined.

BRIEF DESCRIPTION OF THE DRAWINGS

FIG. 8 is an example of a location reference code and associated information, as shown in FIG. 7, for a store.

FIG. 9 is an example of a location reference code and associated information, shown in FIG. 7, for a mall.

DETAILED DESCRIPTION OF THE PRESENTLY PREFERRED EMBODIMENTS

Figure 1:
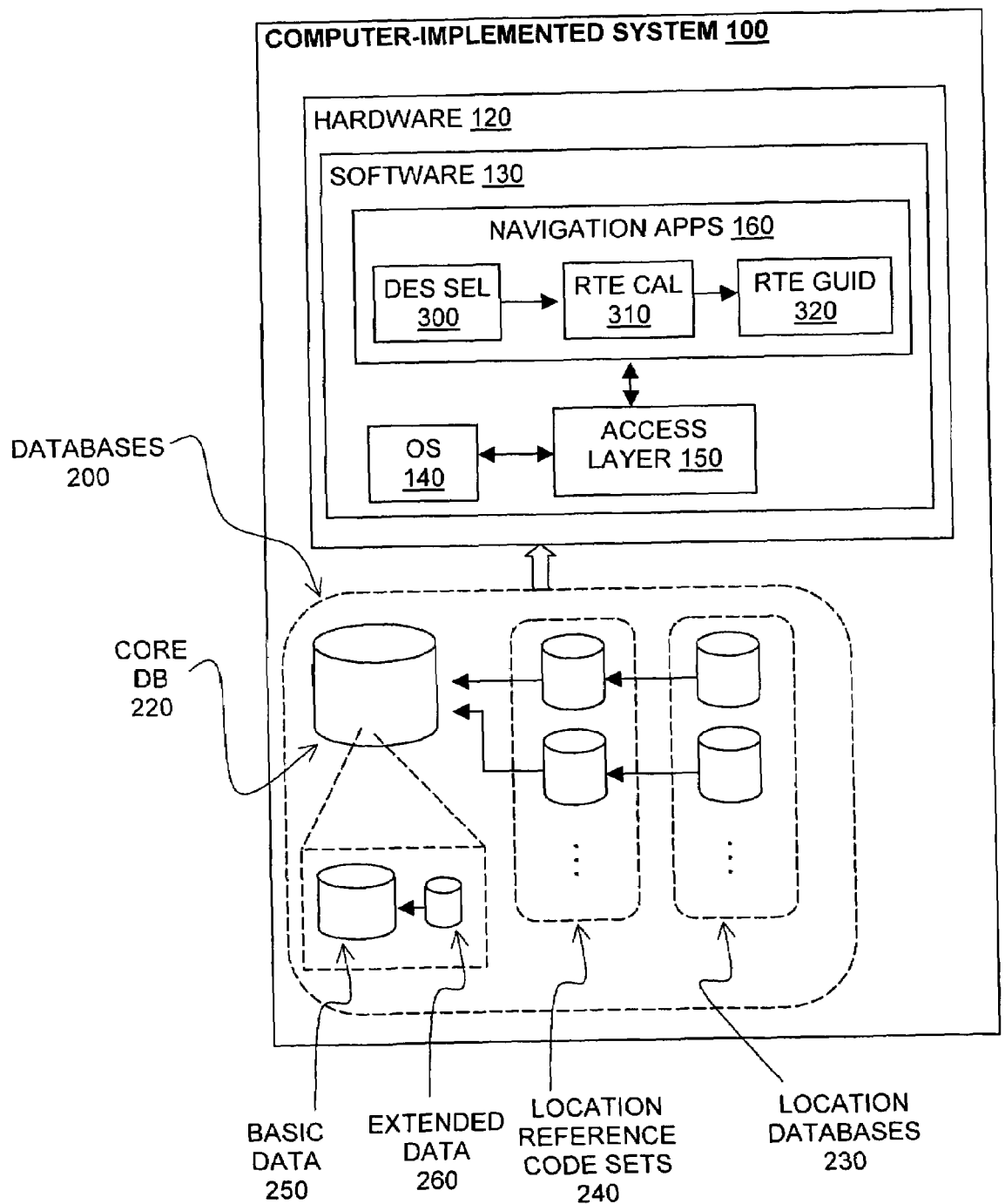
FIG. 1 is a block diagram of a first embodiment of a system for providing navigation and mapping features with expanded and extended detail.

FIG. 1 shows general components of a system 100 for providing geographic and navigation-related information to users. The system 100 is a combination of computer hardware 120, software 130, and data. The computer hardware 120 includes memory, processor(s), data storage, and other necessary components. These may be conventional components.

The software 130 includes an appropriate operating system 140, data access software 150 for accessing the data, and navigation- and/or map-related applications 160 for using the geographic data to provide meaningful information to users of the system. The software 130 may include other applications and/or programs. The software may be conventional, except as noted below.

The system 100 includes an appropriate user interface (not shown), including hardware and software that allow a user to input information into the system and receive information from the system. The user interface may include a monitor, keyboard, keypad, touch screen, speakers, microphone, etc.

The system 100 in FIG. 1 may be a proprietary system or a general-purpose system. Alternatively, parts of the system may be proprietary and other parts may be general purpose. The system 100 in FIG. 1 may be a standalone system or a networked or distributed system. The system 100 of FIG. 1 may be portable, e.g., a notebook computer, a mobile phone, an in-vehicle navigation system, etc., or non-portable, e.g., a desktop computer system.

The system 100 in FIG. 1 uses data that represents features in one or more physical geographic regions. In this embodiment, the data is contained in one or more databases 200. Each database 200 may be physically located with the other components of the system 100. Alternatively, some or all of the data may be located remotely from the other components and accessed over a suitable communications link or network.

In this embodiment, the database 200 is comprised of multiple parts. These parts include a core database 220 and one or more location (or local) databases 230. In addition to these parts, the database 200 includes a location reference code set 240 (or database or table). The location reference code set 240 may be included within either the core database 220 or the location databases 230. Alternatively, the set of location reference codes 240 may be separate from either the core database 220 or the location databases 230.

The different parts of the database 200 are linked or merged so that they can be used like a single database. However, parts of the database can be created, updated, or modified separately or independently of the other parts.

The core database 220 includes a basic portion 250 and an extended portion 260. The basic portion 250 of the core database 220 includes the kind of data included in prior geographic databases. In particular, the basic portion 250 of the core database 220 includes data that represent the public roads in a geographic region. The basic portion 250 of the core database 220 includes information about the roads, such as the locations of the roads, the locations of intersections, road names, address ranges, speed limits, turn restrictions, one-way street information, number of lanes, and so on. The basic portion 250 of the core database 220 may also include information about points of interest (also referred to as "POIs" or "facilities"), such as businesses (e.g., hotels, restaurants, shopping, service stations, etc.), government buildings, police stations, hospitals, recreation areas, and so on.

As stated above, the core database 220 also includes the extended data portion 260. The extended data portion 260 includes data that represent features that connect to and that are accessible from the road network represented in the basic portion 250 of the core database 220. The features represented by the data in the extended portion 260 include those located around destinations. For example, the features represented by data in the extended portion 260 include parking lot geometry (e.g., polygons and POIs), including access roads on private property for reaching parking for a POI. In many cases, a person would not travel on a feature (e.g., a road, parking lot) represented by data in the extended portion 260 unless the person were traveling to or from the POI with which the feature is associated. The extended data portion 260 also includes (1) building footprints, (2) mall footprints, including details of mall anchors, (3) POI location with vanity addressing placed upon extended road geometry, (4) parent-child relationships for buildings and their associated parking, (5) internal POIs, such as mall stores, added to logical parking lot geometry, and (6) optionally, additional internal features, such as escalators and restrooms.

Figure 2:
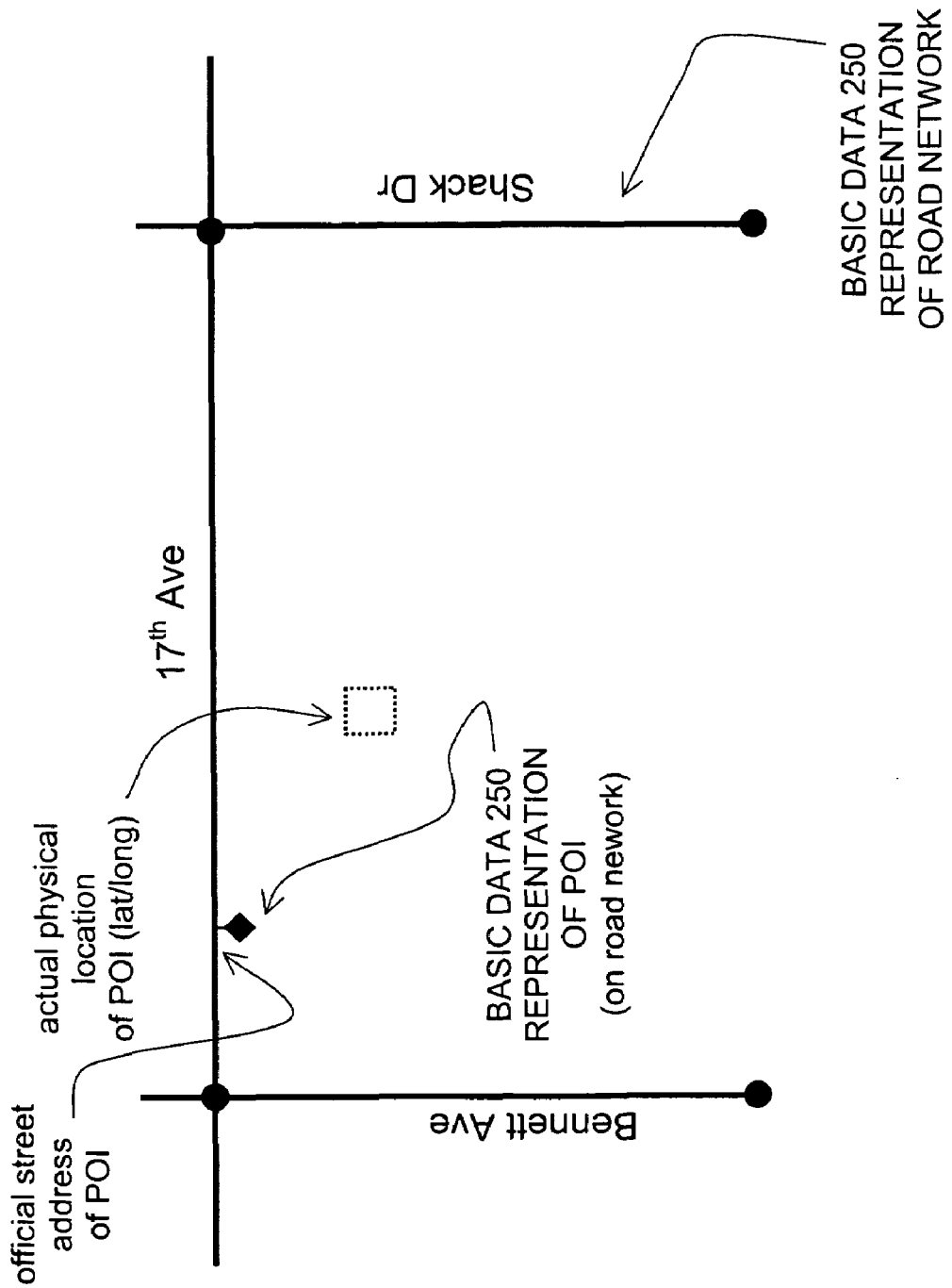
FIG. 2 is a map illustrating some of the kinds of features represented by the data in the basic portion of the core database shown in FIG. 1.
Figure 3:
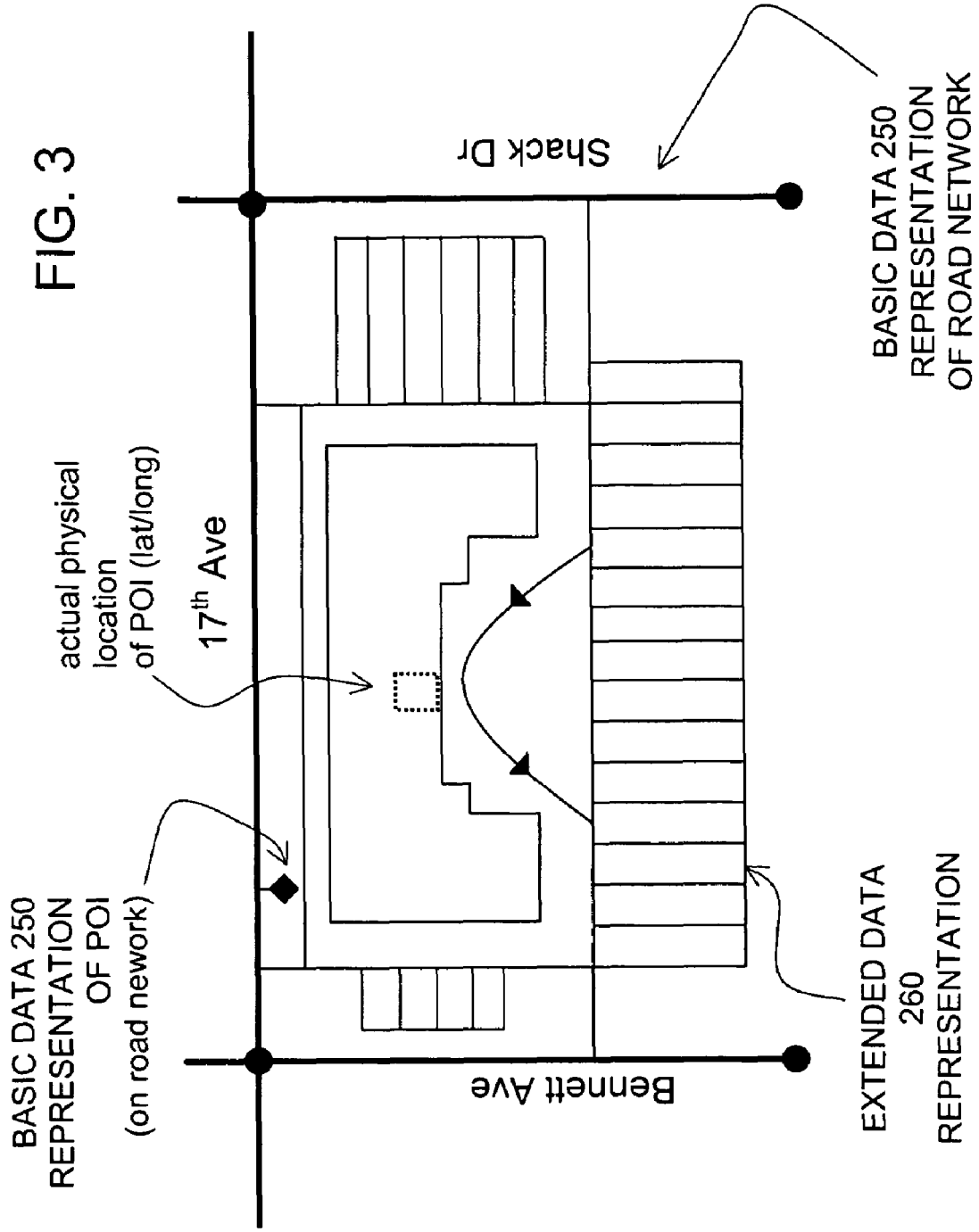
FIG. 3 is a map illustrating some of the kinds of features represented by the data in the basic portion and the extended portion of the core database of FIG. 1.
Figure 4:
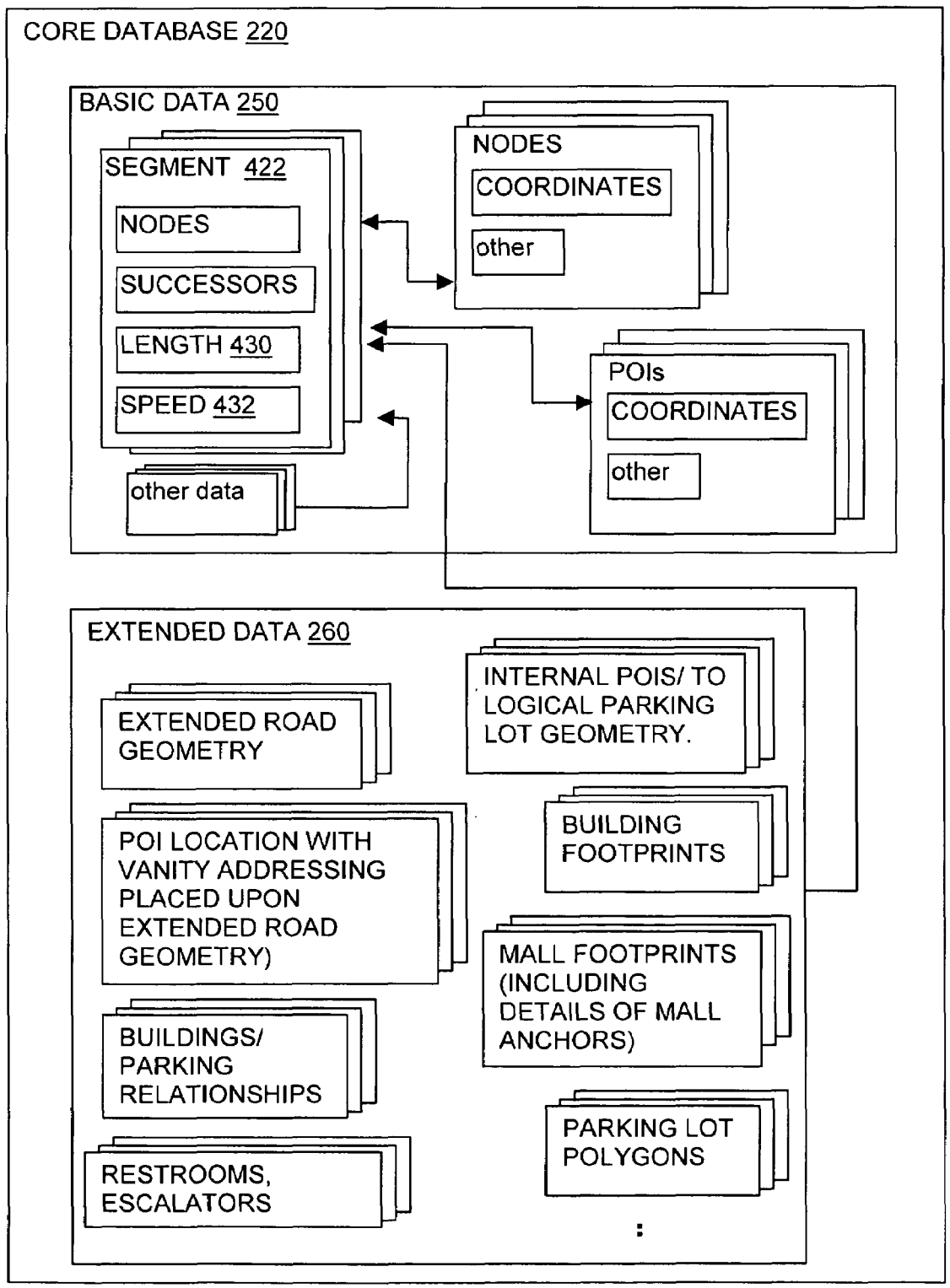
FIG. 4 is a diagram that shows components of the basic portion and the extended portion of the core database shown in FIG. 1.

FIG. 2 is a map illustrating the kinds of features represented by the data in the basic portion 250 of the core database 220. FIG. 3 is a map of the same area shown in FIG. 2 illustrating the kinds of features represented by the data in the basic portion 250 and the extended portion 260 of the core database 220. FIG. 4 is a block diagram that shows components of the basic portion 250 and the extended portion 260 of the core database 220.

As mentioned in connection with FIG. 1, the database 200 used by the system 100 also includes one or more location map databases 230. Each location map database 230 contains a further extension of the representation provided by the core database 220. Each location map database 230 contains data that (1) represents physical features that are not represented in the core database or (2) represents physical features that are represented in the core database but with a level of detail beyond the level of representation in the core database 220.

Each location map database 230 includes data that represents features that connect to (i.e., that are accessible from and to) the features represented by the data contained in the core database 220. The features represented by data in the location map database 230 are accessible from features represented in either the basic part 250 or the extended part 260 of the core database 220. A feature represented by data contained in the location map database 230 may be accessible directly from a feature represented in the core database 220 or may be accessible from a feature represented in the core database 220 via one or more other features represented in the location map database 230.

Some of the types of features represented in the location map databases 230 include (1) an internal footprint for internal detail (e.g., the floorplan) of a POI, (2) an enhanced building footprint, (3) entrance points associated to stores and other POIs, (4) extended POI attributes (rich content), and (5) enhanced cartographic representation.

Figure 5:
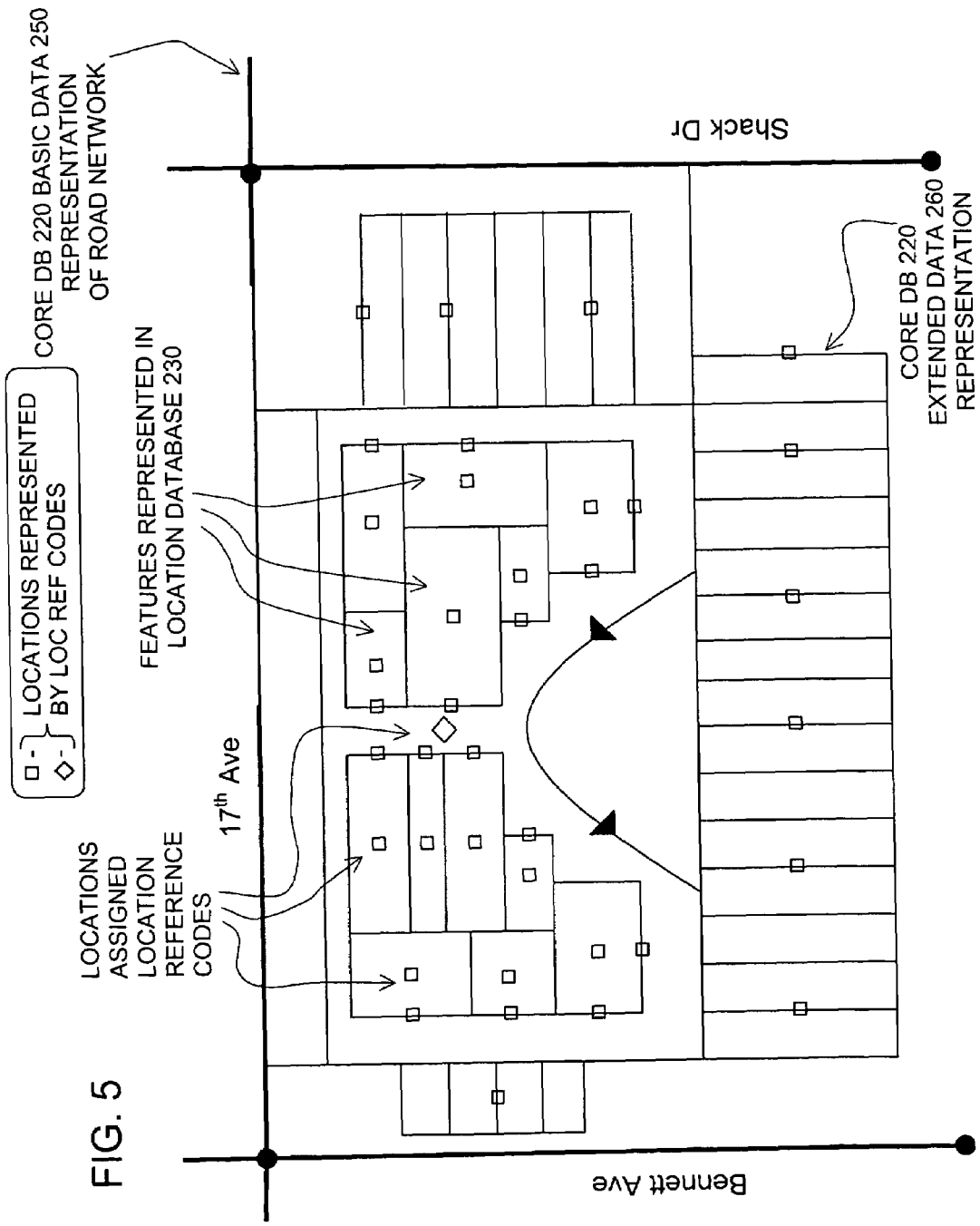
FIG. 5 is a map illustrating some of the kinds of features represented by the data in the basic portion of the core database, the extended portion of the core database and the location map database of FIG. 1.

FIG. 5 is a map of the same area shown in FIGS. 2 and 3 illustrating the kinds of features represented by the data in the location map database 230 and the data in the core database 220.

As mentioned in connection with FIG. 1, the database 200 used by the system 100 includes a table or set 240 of location reference codes 270. The location reference codes 270 enable the data in each location map database 230 to be associated with the data in the core database 220. By enabling the data in the location map databases 230 to be associated with the data in the core database, the location reference codes 270 define paths that connect the features represented by the data in the location map database to the road network represented by the data in the core database 220.

Figure 6:
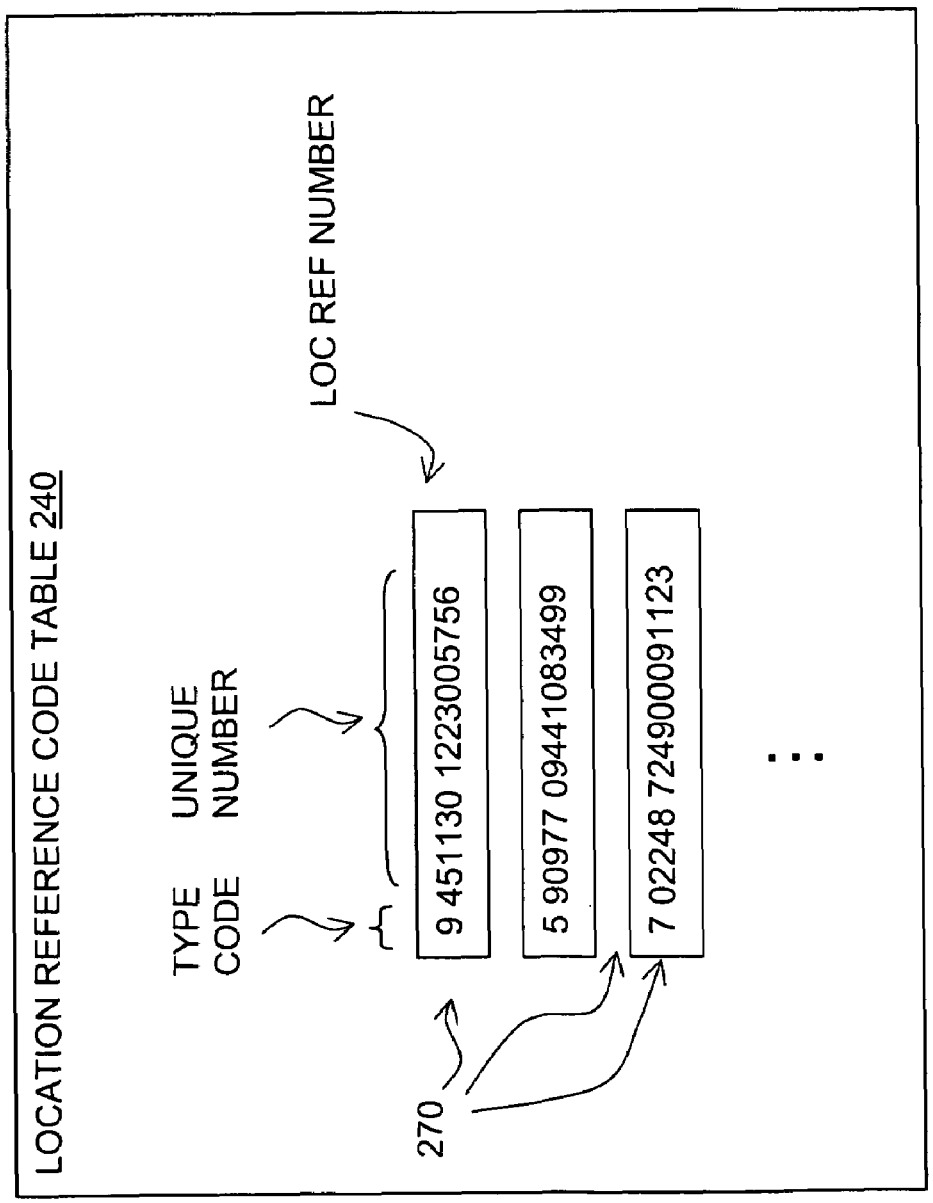
FIG. 6 is a diagram that shows components of the location reference code table of FIG. 1.

FIG. 6 is a diagram showing the components of the location reference code set 240. Referring to FIG. 6, each location code 270 is composed of a unique number or string of alphanumeric characters. In this embodiment, a portion of the location reference code 270 is used to identify the type of feature represented by the location reference code. For example, one or more initial characters in the code may be used to identify the feature type. Feature types may include businesses, portals, parking, etc. In the present embodiment, each of these different types is identified by the same number or character, e.g., a business may be represented using a "9", a portal may be represented using a "2", and parking may be represented using a "5."

Figure 7:
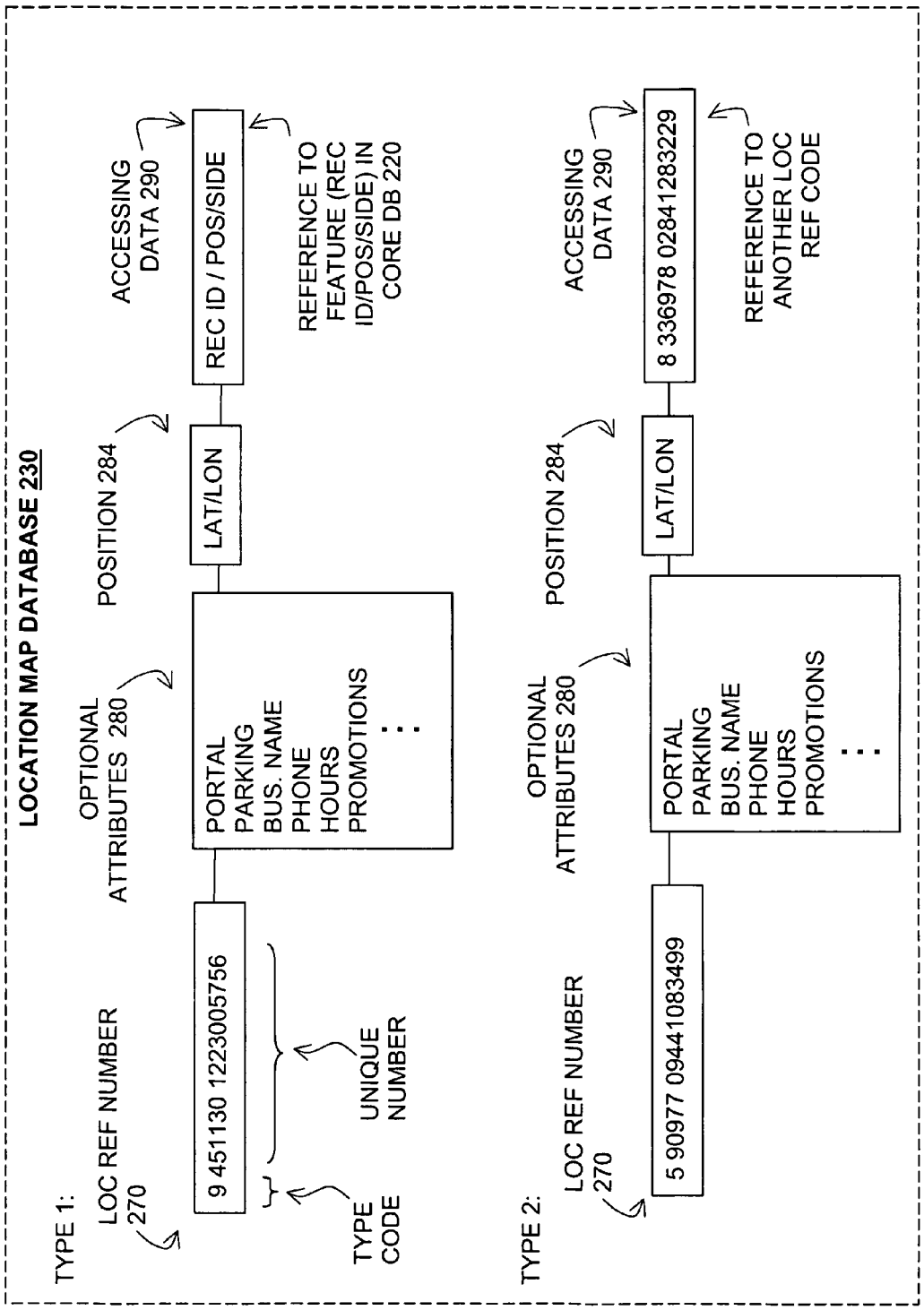
FIG. 7 is a diagram that shows components of one or the location map databases of FIG. 1.

FIG. 7 is a diagram showing details about how location reference codes are used in one of the location map databases 230. In the location map database 230, each location code 270 is associated with optional attributes 280. The optional attributes 280 include information about the feature represented by the location reference code 270. The optional attributes 280 may indicate the type of feature, the name of the feature, a vanity address of the feature, etc. If the feature is a business, the optional attributes 280 may include the phone number, hours of operation, promotions, etc. As mentioned above, sometimes a building has a street address on the public road network, but is actually located some distance off the public road network, e.g., across a parking lot or driveway. In these cases, the location reference code 270 for the building would include an optional attribute 280 that indicates the street address for the building. (This would enable a search for the street address to find the actual location of the building.) Likewise, some locations lack traditional street address information and are only identified by alternate identifiers (e.g., Morrill Hall, Bldg 17 in a complex, Gate 3). This data can also be stored and referenced in the location database.

The optional attributes may also contain information that can be used for landmark-based guidance (e.g., right at the ABC store). Alternatively, landmark-based guidance may be contained in another attribute associated with the location reference code in a location database.

Still referring to FIG. 7, in the location map database 230, each location code 270 is associated with data 284 indicating a specific physical location. The physical location may be expressed by geographic coordinates (e.g., latitude, longitude, and optionally altitude or elevation level) or by any other means.

In the location map database 230, each location reference code 270 also is associated with accessing data 290. There are two kinds of accessing data 290 that a location reference code 270 may be associated with. As shown in FIG. 7, a first type of accessing data 290 is a reference to a feature represented in the core database 220. As an example, accessing data 290 of this first type may identify a road segment represented in the core database 220. The accessing data 290 may identify the road segment by its database record ID, or by any other means. In the case of a road segment, the accessing data 290 may also indicate a position along the identified road segment and a side of the road segment. This first type of accessing data 290 is used with a location reference code that represents a feature located directly on or connected to a feature represented in the core database 220. For example, a driveway that connects directly to a road represented in the core database 220 would be represented by a location reference code 270 associated with accessing data 290 that identifies the road segment (e.g., by database record ID), a location along the road segment (i.e., where the driveway physically connects to the road segment, e.g., 71 meters from the east end of the road segment), and side (i.e., which side of the road segment the driveway physically connects to, e.g., the south side of the road segment).

Still referring to FIG. 7, the second type of accessing data 290 that can be associated with a location reference code 270 is a reference to another feature represented in the location map database 230 and which is associated with another location reference code 270. This second type of accessing data 290 identifies the other feature by the location reference code 270 associated with that other feature. This second type of accessing data 290 is associated with a location reference code that represents a feature that is not directly located on or accessible from a feature represented in the core database 220, but which connects to a feature represented in the core database 220 via one or more other features in the location database 230 that are represented by location reference codes 270.

As stated above, location reference codes are assigned and used to identify features (e.g., places) located away from the public road network. Location reference codes are also used to enable navigation and routing to features located away from the public road network. The following explains how location reference codes provide these functions.

Some features represented by location reference codes in the location database are directly accessible from the road network represented by the core database 220. These features may be ultimate destinations, but they may also be access points, such as driveways, that lead to other features. The location reference code for a feature directly accessible from the road network is associated with accessing data 290 that identifies the road segment (or other feature) from which it is accessible. As explained above, the road segment from which this kind of feature is accessible may be identified by a database ID associated with the road segment. The accessing data 290 may also identify a position along a road segment and a side of the road segment from which the feature is accessible.

Other features represented by location reference codes in the location database are not directly accessible from the road network represented by the core database 220. The location reference code for a feature that is not directly accessible from the road network represented by the core database 220 is associated with accessing data 290 that identifies at least one other location reference code that represents a feature not located on the road network represented by the core database 220, but that is associated with accessing data 290 that references, directly or through one or more other location reference codes, a position on the road network represented by the core database 220.

In a present embodiment, location reference codes are used for representing at least three different types of features. First, location reference codes are used to identify the positions of final or ultimate destinations, some of which may be located away from the public road network. These final or ultimate destinations may be stores, businesses, offices, (e.g., "POIs" or "facilities") etc., that an end user might want to travel to.

Second, location reference codes are used to identify the locations of access points along the public road network (represented in the core database) at which represented locations off the public road network can be accessed. These access points may be driveways, parking lot entrances, etc.

Third, location reference codes are used to identify intermediate points located between the ultimate destinations and the road network represented in the core database. These intermediate points define locations through which a person may be required to pass in order to travel between the public road network and the ultimate destination. An additional factor taken into account when selecting and assigning intermediate points to be represented by location reference codes is to choose points that are close enough together or readily observable from each other so that a user can easily discern and follow a path from one intermediate point to the next intermediate point.

Following are several examples of such intermediate points. An intermediate point may be used to define the location of a mall's parking lot. Another intermediate point may be used to define the location of an entrance doorway (e.g., a portal) into a mall from the mall's parking lot. The parking lot or the entrance doorway of the mall building may not be a person's actual desired ultimate destination. Rather, the person's actual ultimate destination may be a specific shop located within the mall building. However, the person is required to pass through the parking lot and the entrance doorway from the mall parking lot to the desired ultimate destination of the shop inside the mall. The locations of the mall parking lot and the mall entrance doorway would be intermediate points. A unique location code would be defined for each of these features.

The unique location code 270 defined for the point for the mall parking lot would be associated with position data 284 that indicates the location (e.g., latitude, longitude, altitude) of the mall parking lot. The unique location code 270 defined for the mall entrance doorway would be associated with position data 284 that indicates the location of the mall entrance doorway. The unique location code 270 defined for the shop within the mall would be associated with position data 284 that indicates the location of the shop within the mall, i.e., an ultimate destination.

The unique location code 270 for the shop within the mall would also be associated with accessing data 290 that identifies the location code 270 for the mall entrance doorway. In turn, the unique location code 270 of the mall entrance doorway would be associated with accessing data 290 that identifies the location code 270 for the mall parking lot. Further in turn, the unique location code 270 for the mall parking lot would be associated with accessing data 290 that identifies the location code 270 for the driveway into the parking lot. Finally, the unique location code 270 for the driveway into the parking lot would be associated with accessing data 290 that identifies the road segment (record ID, position along segment, side) from which the driveway is accessible from the public road network.

The accessing data associated with location reference codes define paths between facilities and the public road network. These paths may be vehicle paths, pedestrian paths, or various combinations thereof.

In one embodiment, the information associated with a location reference code (e.g., in a location database) is maintained in one or more spatial formats. Various spatial formats would be suitable. The data would be output in an output or delivery format, such as XML. FIG. 8 is an example of an XML document containing information associated with a location reference code for a store. FIG. 9 is an example of an XML document containing information associated with a location reference code for a mall.

In one embodiment, location reference codes are assigned to features by a map developer. The map developer may use aerial photographs, source maps, and/or observations by field personnel to identify the routing patterns around destinations, such as shopping malls, industrial parks, business centers, etc. Alternatively, the map developer may provide a website or portal that allows businesses to identify and define location reference code positions around their own businesses.

Operation and Use

As explained above in connection with FIG. 1, a computer-implemented system 100 includes navigation software applications 160 that use the database 200 to provide navigation- and map-related functions to end users. Among the navigation software applications 160 in FIG. 1 are a destination selection application 300, a route calculation application 310 and a route guidance application 320. These may be separate applications or these applications may be combined into a single application that includes all the functions.

Figure 10:
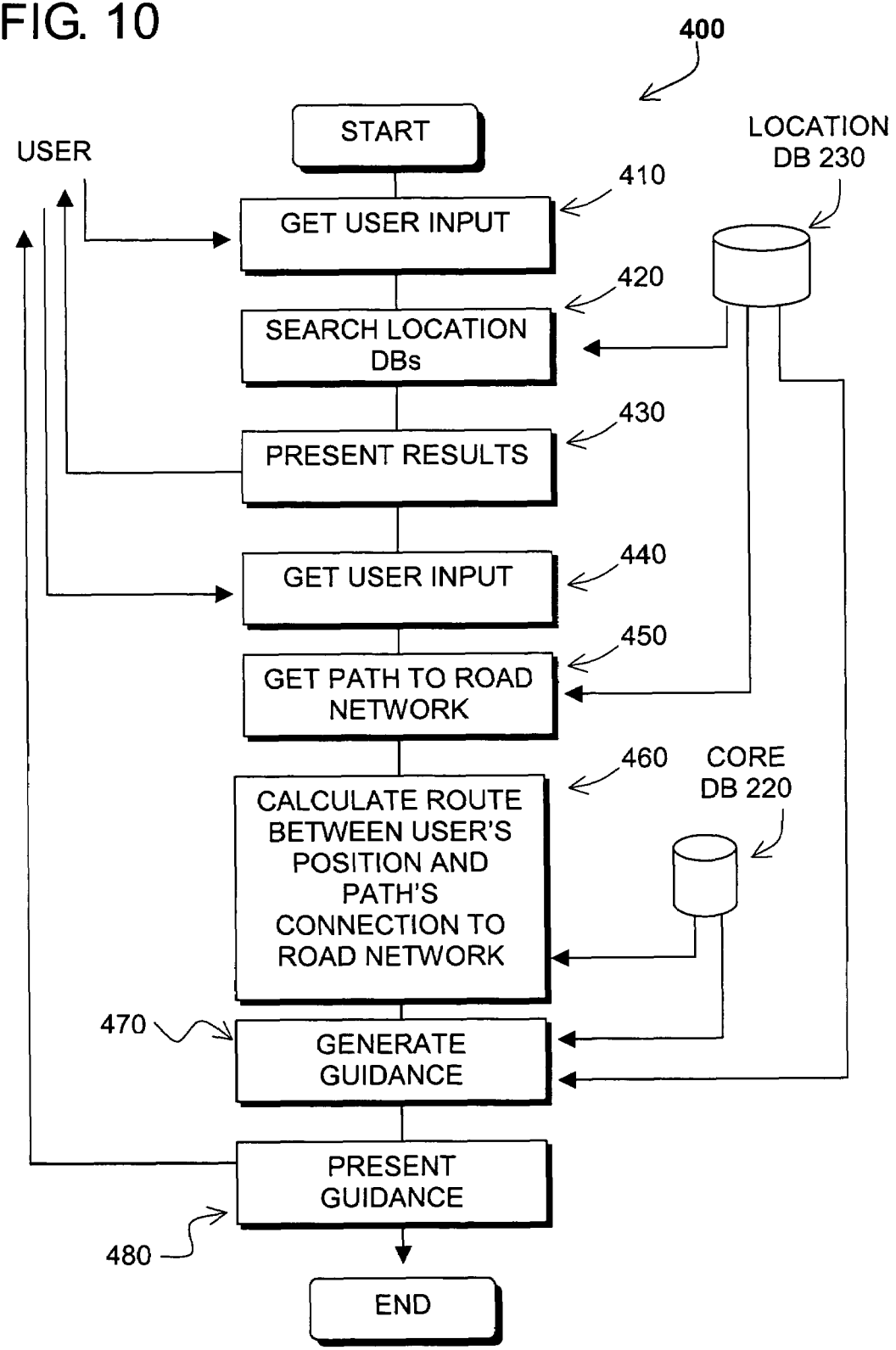
FIG. 10 is a flowchart showing a process for using the database in FIG. 1 for providing destination selection and route guidance.

FIG. 10 shows an exemplary process 400 performed by the system 100 of FIG. 1. In an initial step of the process 400, the destination selection application 300 (in FIG. 1) accepts a user's specification of information for identifying one or more possible places to be used as a destination (Step 410 in FIG. 10). The information may be the name of a business (e.g., Macy's, Mobil), a type of business (e.g., department store, gas station), a type of product (e.g., clothing, gasoline), and so on.

The destination selection application 300 uses the location databases 230 to find possible destinations that match the search criteria (Step 420 in FIG. 10). The contents of the optional attributes 280 (in FIG. 7) associated with location reference codes may be used for this purpose. The contents of the optional attributes 280 may be indexed or otherwise processed or arranged to facilitate rapid searches.

Upon finding one or more potential matches for a user's search request, the destination selection application 300 provides the results to the end user (Step 430 in FIG. 10). The destination selection application 300 may provide the user with various details about each of the potential matches, such as a location of each potential destination, a distance from the user's position to the potential destination, a description of the location, a phone number, hours of operation, promotions, etc. Upon the selection by the user of one of the presented potential destinations (Step 440 in FIG. 10), the destination selection application 300 uses the location reference code 270 for the selected destination to determine the location (i.e., the access point) at which a path to the selected destination connects to the public road network (Step 450 in FIG. 10). As explained above, a location reference code 270 assigned to a destination is associated with data from which a path to the public road network may be determined. If the destination is located or connected directly on the public road network, the location reference code 270 assigned to the destination may indicate a position on the road network (by identifying a record ID for a particular road segment). Alternatively, if the destination is located physically away from the public road network, such as a store in a shopping mall, the location reference code assigned to a destination may indicate a connection to the public road network indirectly, i.e., via one or more other location reference codes. For example, the location reference code assigned to a store in a shopping mall may identify (i.e., in the accessing data 290 associated with the location reference code for the store) an entrance door to the mall by the location reference code assigned to the entrance door. In turn, the location reference code for the entrance door may identify the closest parking lot by the location reference code assigned to the parking lot. The location reference code assigned to the parking lot may identify the driveway into the parking lot by its location reference code. Finally, the location reference code for the driveway may identify where the driveway connects to the public road network by identifying the database ID (and position and side) of a road segment that is part of the public road network.

Once the path connecting the destination to the public road network is determined, the route calculation application 310 (in FIG. 1) is used to calculate a route from the user's current position to the location of the connection to the public road network, e.g., the access point (Step 460 in FIG. 10). The route calculation application 310 uses the data in the core database 220 for this purpose. The route calculated by the route calculation application 310 to the access point is added to the path determined by one or more location reference codes from the access point to the ultimate destination to form an entire route. Then, the route guidance application 320 in FIG. 1 is used to generate guidance, such as maneuvering instructions, for following the route. The guidance includes instructions for traveling along the public road network, as well as traveling along the path to the ultimate destination from the location at which the route leaves the public road network (Step 470 in FIG. 10). The route guidance is presented to the user via the user interface of the system 100 (Step 490 in FIG. 10).

Advantages

The disclosed embodiments provide a reliable, efficient way to represent features that are located off the public road network. The public road network is represented in the core database with a sufficient amount of information so that routing algorithms can determine an optimum route along the roads between any two specified points along the represented roads. However, in areas physically located off the public road network, such as in shopping malls, office parks, around stadiums and convention centers, etc., conventional routing approaches are not necessarily applicable. These types of features tend to be located relatively close together and have distinct, relatively well-defined relationships. For example, a building may have one or more distinct entrances, each of which is associated with one or more parking areas. Using location reference codes to represent the locations of entrances and their associated parking areas allows these features to be related with each other to define the particular route to a building via a particular entrance.

The disclosed embodiments enable data contained in location (or local) databases to be associated to the data in the core database. Thus, coverage of the core database can be extended to include the features represented by the location databases. Location reference codes are used to provide the association between the features represented in the location data and the core database because the features represented in the location database are not represented with the same types of navigable attributes that enable reliable routing as those in the core database.

Another advantage of the disclosed embodiments is that they allow location map databases to be created, modified, and updated independently of the core database. The disclosed embodiments also allow a map developer to let businesses or other third parties add and update their own information in a location database independently of the core database.

Alternatives

In some of the embodiments disclosed above, it was described how location databases could be used to represent shops, entrances, and parking in shopping malls and other commercial establishments. The embodiments disclosed herein can be used for any type of facility that occupies a geographic area. Some examples include a building or suite in a complex, a section in a theater, campuses, sports stadiums, military installations, recreational areas, refuges, quarries, wilderness areas, and so on.

In connection with a disclosed embodiment, it was described that the basic portion of the core database includes the kind of data included in prior geographic databases, such as data that represent the public roads in a geographic region. In an alternative embodiment, the core database may also include data about private or other non-public roads.

As stated above, each location reference code assigned to a feature represented in a location database is associated with data that connects the feature back to the road network represented in the core database. In an alternative embodiment, location reference codes may be associated with some locations that are not connected back to the road network represented in the core database. For example, a location reference code may be used to represent escalators and restrooms in a building. The position of the escalator or restroom would be provided for information purposes for a user. According to another example, a location reference code may be used to represent a landmark, such as Old Faithful, a waterfall in a national park, the charter oak, etc., that can be viewed and photographed, but not actually entered.

It is intended that the foregoing detailed description be regarded as illustrative rather than limiting and that it is understood that the following claims including all equivalents are intended to define the scope of the invention.

We claim:

1. A geographic database system comprising:
    a representation of a main road network in a geographic region, including representations of roads of which said main road network is comprised;
    representations of access points, wherein each of said access points corresponds to a location at which the main road network is accessible from locations away from the main road network, and wherein each of said access points is associated with a corresponding location reference code that indicates the location of the represented access point; and
    representations of facilities that are physically located away from the main road network and access to which requires travel on paths other than said main road network, wherein each of said representations of facilities is associated with a corresponding location reference code that indicates the location of the represented facility, and further wherein each of said representations of facilities is associated with an indication of a path to an associated access point.

2. The geographic database system of claim 1 wherein said representations of a main road network, access points, and facilities are stored on a computer-readable medium.

3. The geographic database system of claim 1 wherein said representations of said facilities is updatable independently of said representation of said main road network.

4. The geographic database system of claim 3 wherein said representations of said facilities is updatable by personnel of said facilities via a web portal.

5. A geographic database system comprising:
    a core database that includes data that represents a public road network in a geographic region; and
    a plurality of location databases, each of which represents features located physically away from the public road network,
    wherein each feature represented in one of the location databases is represented by a location reference code, and
    wherein each location reference code is associated with data that indicates a way to access the feature from the public road network.

6. The geographic database system of claim 5 wherein the data that indicates the way to access the feature from the public road network indicates either a position on the public road network or another feature represented in the location database that is represented by a location reference code associated with data that indicates directly or indirectly a position on the public road network.

7. The geographic database system of claim 5 wherein the data that indicates the way to access the feature indicates either a position on the public road network or another feature represented in the location database that is represented by a location reference code associated with data that indicates, directly or via one or more other location reference codes, a position on the public road network.

8. The geographic database system of claim 5 wherein the plurality of location map databases are updatable independently of the core database.

9. The geographic database system of claim 5 wherein the location map databases are used to represent an internal footprint for internal detail of a POI, an enhanced building footprint, entrance points associated to stores and other POIs, extended POI attributes, enhanced cartographic representation, and additional internal features.

10. The geographic database system of claim 5 wherein the core database comprises a basic portion and an extended portion.

11. The geographic database system of claim 10 wherein the extended portion of the core database is used to represent parking lot geometry, including access roads on private property for reaching parking for a POI, building footprints, mall footprints, including details of mall anchors, POI location with vanity addressing placed upon extended road geometry, parent-child relationships for buildings and associated parking, internal POIs, and other related features.

12. The geographic database system of claim 10 wherein the basic portion of the core database is used to represent public roads in the geographic region.

13. A database for geographic data comprising:
(i) representations of public roads in a geographic region;
(ii) street address information associated with said representations of public roads;
(iii) representations of facilities having street addresses along said public roads, but which are physically accessible via non-public roads;
(iv) representations of said non-public roads;
(v) data indicating locations along said public roads at which said non-public roads are accessible; and
(vi) data associating said facilities with the non-public roads via which said facilities are accessible.

14. The database for geographic data of claim 13 wherein said representations are stored on at least one computer-readable medium.

15. The database for geographic data of claim 13 wherein said representations of said facilities is updatable independently of said representations of said public roads.

16. A method for representing facilities located off a public road network comprising:
identifying geographic positions of facilities located off the public road network;
identifying geographic positions of one or more points that define a path connecting each of said facilities to the public road network;
assigning location reference codes to said geographic positions; and
associating with each of said location reference codes data that defines a path that connects each geographic position assigned a location reference code and the public road network via one or more geographic positions to which geographic reference codes have been assigned.

17. The method of claim 16 further comprising:
associating with any of said location reference codes assigned to a geographic position not on the public road network data that identifies another of said location reference codes in order to define a path that connects any geographic position assigned a location reference code and the public road network via one or more geographic positions to which geographic reference codes have been assigned.

18. The method of claim 16 wherein some of said geographic positions to which location reference codes are assigned correspond to portals.

19. The method of claim 16 wherein some of said geographic positions to which location reference codes are assigned correspond to parking lots.

20. The method of claim 16 further comprising:
storing said location reference codes and data associated therewith on a computer-readable medium.

21. The method of claim 16 further comprising:
associating with at least some of said location reference codes data that identifies a geographic position corresponding thereto.

22. The method of claim 16 further comprising:
associating with at least some of said location reference codes data that identifies optional attributes.

23. The method of claim 22 wherein said optional attributes include:
type of feature, name of feature, vanity address of feature, phone number, hours of operation, promotions, street address on the public road network.

24. The method of claim 16 further comprising:
associating with at least some of said location reference codes information that can be used for landmark-based guidance.

25. The method of claim 16 wherein said public road network is represented by a core database.

26. The method of claim 16 wherein said location reference codes are unique.

27. The method of claim 16 wherein said location reference codes are alphanumeric strings.

28. A method for determining a route to a desired destination at a facility comprising:
using a database that includes representations of facilities that are physically located away from a main road network and access to which requires travel other-than-on said main road network,
upon determining one of said facilities as the desired destination, accessing data associated with said representation of said facility that indicates a path to the facility from an associated access point, wherein said access point corresponds to a location at which a main road network is accessible from locations away from the main road network;
using a data representation of the main road network to calculate a route to the access point associated with the one of said facilities determined to be the desired destination; and
combining the calculated route with the indicated path from the associated access point data to the one of said facilities determined to be the desired destination.

29. The method of claim 28 wherein at least part of said path is for pedestrian travel.

30. A method for calculating a route to a destination comprising:
receiving a specification of a desired destination;
using the specification to search a location database for a potential destination that matches the specification;
using a core database to calculate a route between an origin and an access point on a road network; and
using the location database to determine a path between the access point and the potential destination, wherein the path is determined by data stored in the location database that indicates paths connecting points to which location reference codes have been assigned back to the road network via one or more other points.

31. The method of claim 30 wherein at least part of said path is for pedestrian travel.

* * * * *